United States Patent [19]
Douglas

[11] Patent Number: 5,946,031
[45] Date of Patent: Aug. 31, 1999

[54] ELECTRONIC STILL CAMERA WITH PRINTING CAPABILITY

[75] Inventor: Lawrence M. Douglas, South Easton, Mass.

[73] Assignee: Polaroid Corporation, Cambridge, Mass.

[21] Appl. No.: 08/735,409

[22] Filed: Oct. 22, 1996

[51] Int. Cl.⁶ .................................................. H04N 5/227
[52] U.S. Cl. ........................... 348/207; 396/30; 396/348; 396/351; 348/373
[58] Field of Search ..................................... 348/333, 231, 348/233, 207, 373; 358/906; 396/30, 345, 346, 347, 348, 350, 351, 352, 457; 355/402, 403, 404

[56] References Cited

U.S. PATENT DOCUMENTS

| | | | |
|---|---|---|---|
| 4,262,301 | 4/1981 | Erlichman | 386/31 |
| 4,389,110 | 6/1983 | Pizzuti | 396/178 |
| 4,937,676 | 6/1990 | Finelli et al. | 348/375 |
| 5,128,773 | 7/1992 | Sato | 386/42 |
| 5,289,227 | 2/1994 | Kinjo | 396/78 |
| 5,606,420 | 2/1997 | Maeda et al. | 358/296 |
| 5,666,578 | 9/1997 | Oikawa et al. | 396/319 |
| 5,742,341 | 4/1998 | Ohishi et al. | 348/373 |
| 5,805,936 | 9/1998 | Matsuzaki et al. | 396/30 |

FOREIGN PATENT DOCUMENTS

| | | | |
|---|---|---|---|
| 0 398 295 A2 | 5/1989 | European Pat. Off. | H04N 1/00 |
| 0 574 581 A1 | 12/1990 | European Pat. Off. | H04N 5/225 |
| 0 508 872 A2 | 6/1991 | European Pat. Off. | H04N 1/46 |
| 0 720 388 A2 | 12/1994 | European Pat. Off. | H04N 9/04 |

*Primary Examiner*—Wendy Garber
*Assistant Examiner*—M. White
*Attorney, Agent, or Firm*—Barry Gaiman

[57] ABSTRACT

A photographic apparatus combines an image capturing apparatus with an image rendering apparatus, where the image capturing apparatus operates as an electronic camera and has an integral liquid crystal display panel for viewing acquired images prior to printing the images onto a photosensitive medium. The images are individually selectable to adjust image properties prior to transmittal of the image to a high-resolution liquid-crystal display in the image rendering apparatus. The image rendering apparatus produces an image on the photosensitive medium by projecting illumination through the image present in the high-resolution liquid-crystal display, through a copy lens, and onto the medium.

20 Claims, 7 Drawing Sheets

ELECTRONIC STILL CAMERA WITH PRINTING CAPABILITY

BACKGROUND OF THE INVENTION

1. Field of the Invention

This invention in general relates to photographic apparatus and, more specifically, to photographic apparatus which capture images electronically and subsequently print onto photosensitive media.

2. Description of the Prior Art

Conventional photographic cameras record an image by exposing to image-bearing light photosensitive media, such as silver-halide based film or paper. The exposed photosensitive medium may then be sent to a commercial processing facility for chemical developing and printing onto photographic paper, so as to allow a user to view the recorded image as a photographic print. This process results in an extended delay of several hours or days between the exposure of the photosensitive medium and viewing the resultant photographic print.

Moreover, the quality of the resultant prints cannot be determined in advance of submittal to the processing facility. As a result, there is an unwanted expense incurred in having poor and undesirable images printed along with the acceptable images. Perhaps the most serious drawback of the conventional photographic process is that, because the user has no way of determining in advance which recorded images will be poor or undesirable, there may be no incentive to "retake" a particular subject, and more importantly, there may be no opportunity for a retake after the resultant prints have been reviewed.

"Instant" photographic apparatus, such as those manufactured by the Polaroid Corporation, are capable of producing photographs shortly after the photosensitive medium has been exposed. In such apparatus, the delay between image acquisition and viewing the print is reasonably short and allows the user to determine whether a photograph needs to be retaken. However, these apparatus do not overcome the shortcoming of the expense incurred in producing unacceptable prints. Further, since there are no post-exposure image processing capabilities in most conventional photographic apparatus, the user is unable to modify print characteristics such as color, contrast, or brightness.

Electronic cameras, which acquire image-bearing light by means of a semiconductor image sensor, overcome the problem of extended delay between image acquisition and viewing. During operation of a conventional electronic camera, the acquired image is transformed into electronic signals which are then stored, usually in a memory module such as a hard disk or a memory card. If the electronic camera provides a suitable display, the image may be viewed immediately after acquisition and without the need for printing. If the user is not satisfied with the image as displayed, it may simply be deleted and retaken.

However, conventional electronic cameras lack the capability to provide images on photosensitive media. If the user wishes to produce a photographic print, it may be necessary to download the stored electronic image to a computer, or similar processing unit, and to subsequently transmit to a printing device. The printing device may print the image onto a photosensitive or other medium. Although the use of a conventional electronic camera allows for immediate preview of an acquired image, there remains an unavoidable delay between image acquisition and a printed image.

Accordingly, it is an object of the invention to provide a photographic apparatus which incorporates the previewing advantages of an electronic camera with the ability to produce a selected print on a photosensitive medium.

It is another object of the invention to allow a user to print an electronically-stored image onto photosensitive media without the need for first downloading the image to a computer or other processing unit.

It is a further object of the invention to provide a photographic apparatus which enables a user to adjust print characteristics prior to printing the image on a photosensitive medium. Other objects of the invention will be obvious, in part, and, in part, will become apparent when reading the detailed description to follow.

SUMMARY OF THE INVENTION

The aforementioned and other objects are achieved by the invention which provides photographic apparatus and methods associated therewith. The photographic apparatus captures image-bearing light reflected from a subject and images the image-bearing light onto a photosensitive medium, such as photographic film for example. Generally, the photographic apparatus comprises an image capturing assembly, an image rendering assembly and an image selection assembly.

The image capturing assembly acquires the image-bearing light and translates it into image signals representative of the image. The image translation may be performed using an electronic image sensor which serves to store the image electronically. The image selection assembly is then selectively employed to actuate the image rendering assembly by which the selected image is printed onto the photosensitive medium.

In the disclosed photographic apparatus, the images captured by the image capturing assembly are previewed on an integral color liquid crystal display (LCD) panel. The LCD provides the means by which the user can determine suitable adjustment of the print characteristics (i.e., color, sharpness, contrast, etc.) of the stored image. Alternatively, the user can use the LCD in deciding whether to delete the original image and then reacquire an acceptable replacement image.

When satisfactory print characteristics are obtained, the selection assembly actuates the image rendering assembly which projects the desired image onto the photosensitive medium. The photosensitive medium employed is preferably an "instant" photographic medium, but another medium, such as conventional thirty-five millimeter film may also be used. Other features of the invention will be readily apparent when the following detailed description is read in connection with the drawings.

BRIEF DESCRIPTION OF THE DRAWINGS

The structure and operation of the invention, together with other objects and advantages thereof, may best be understood by reading the detailed description to follow in connection with the drawings in which unique reference numerals have been used throughout for each part and wherein.

DESCRIPTION OF THE PREFERRED EMBODIMENTS

While the present invention retains utility within a wide variety of photographic devices and may be embodied in several different forms, it is advantageously employed in a configuration comprising characteristics of both an electronic camera and a printing device. Though this is the form of the preferred embodiment and will be described as such, this embodiment should be considered as illustrative and not as restrictive.

Figure 1:
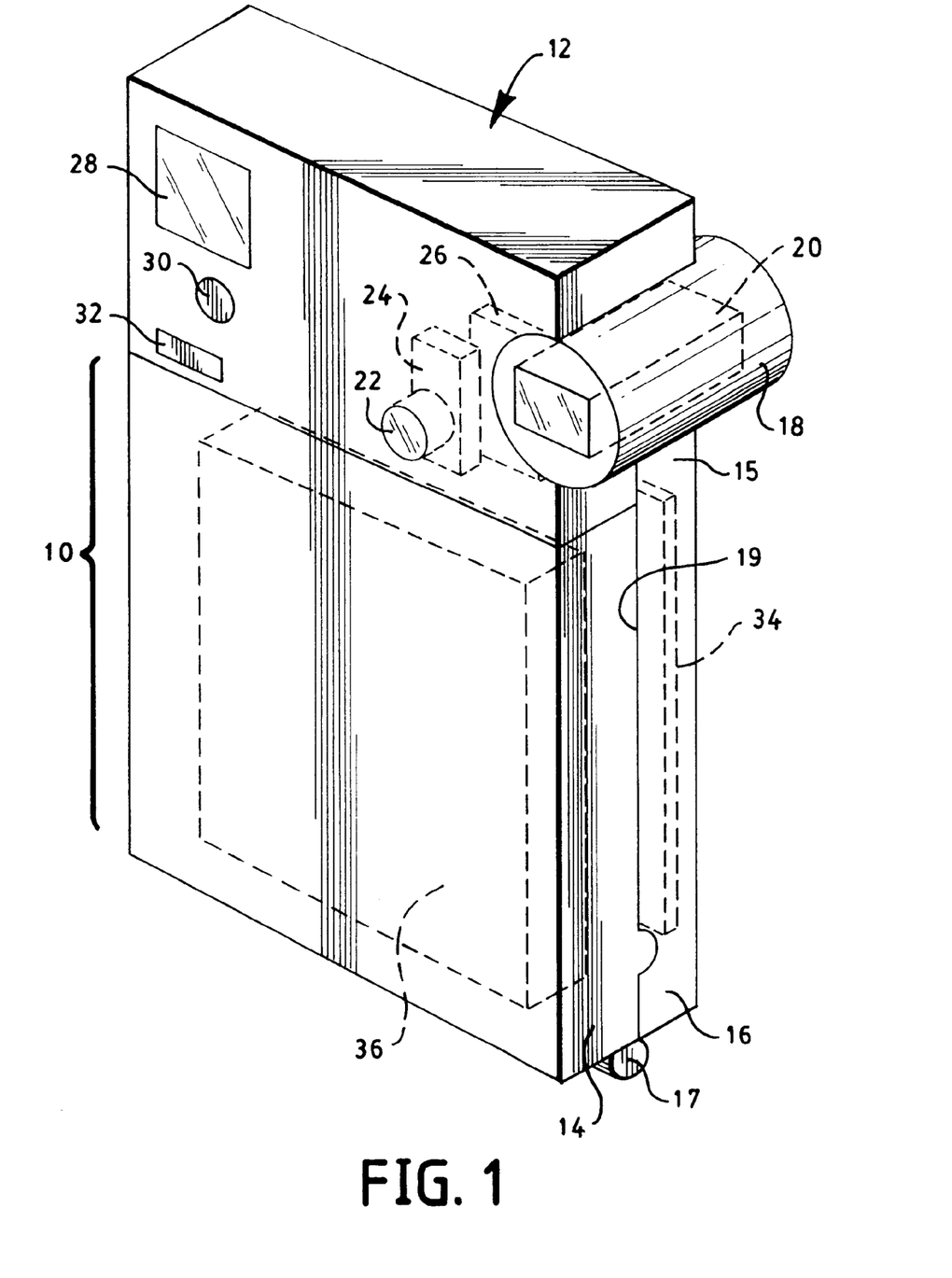
FIG. 1 is a diagrammatic isometric frontal view of the photographic apparatus of the invention, showing an electronic flash on the left side and an imaging lens near the right side of the apparatus.

FIG. 1 shows a photographic apparatus 10 which provides electronic camera operation with a printing capability. Photographic apparatus 10 comprises a housing 12 which, in turn, comprises two subassemblies: a film housing 14 and a photographic housing 16. Film housing 14 is joined to photographic housing 16 by means of a hinge 17 so as to enable film housing 14 to rotate with respect to photographic housing 16. In a closed position, as shown, film housing 14 is at a zero degree (0°) rotation with respect to photographic housing 16 and is thus in mechanical contact along a face 19 of photographic housing 16.

In this closed position, photographic apparatus 10 serves as an electronic camera and provides for image acquisition. A user aims photographic apparatus 10 by locating a subject within a viewfinder 20 disposed within a viewfinder housing 18. Viewfinder housing 18 is located on an edge 15 of photographic housing 16 and protrudes outward so as to allow the user to comfortably place viewfinder 20 against one eye while providing space to accommodate the user's nose beside photographic apparatus 10.

When photographing a subject, the user actuates photographic apparatus 10 by depressing a shutter button 30. The image-bearing light reflected from the subject is then acquired by an imaging lens 22 located adjacent a shutter assembly 24. A shutter (not shown) is disposed within shutter assembly 24, as is well-known in the relevant art, and opens in response to activation of shutter button 30. This action allows the image-bearing light to pass through shutter assembly 24 and into an image sensor assembly 26. The image of the subject is then acquired by an image sensor (not shown) disposed within image sensor assembly 26.

If desired, exposure control can be used to control exposure onto the image sensor and to determine, for example, whether it may be desirable to augment the ambient light level with artificial lighting. In the embodiment shown, a photometer 32 is used to measure light during exposure. If so determined by the photometer's measurement, an electronic flash 28 may be actuated.

In a preferred camera design, housing 12 is substantially planar and rectangular. Such a configuration allows the electronic components necessary for camera operation to be mounted on one or more rigid circuit boards 34 located in photographic housing 16. In comparison to conventional electronic cameras using flex circuits to accommodate fabrication requirements, the use of rigid circuit boards serves to decrease manufacturing costs.

Figure 2:
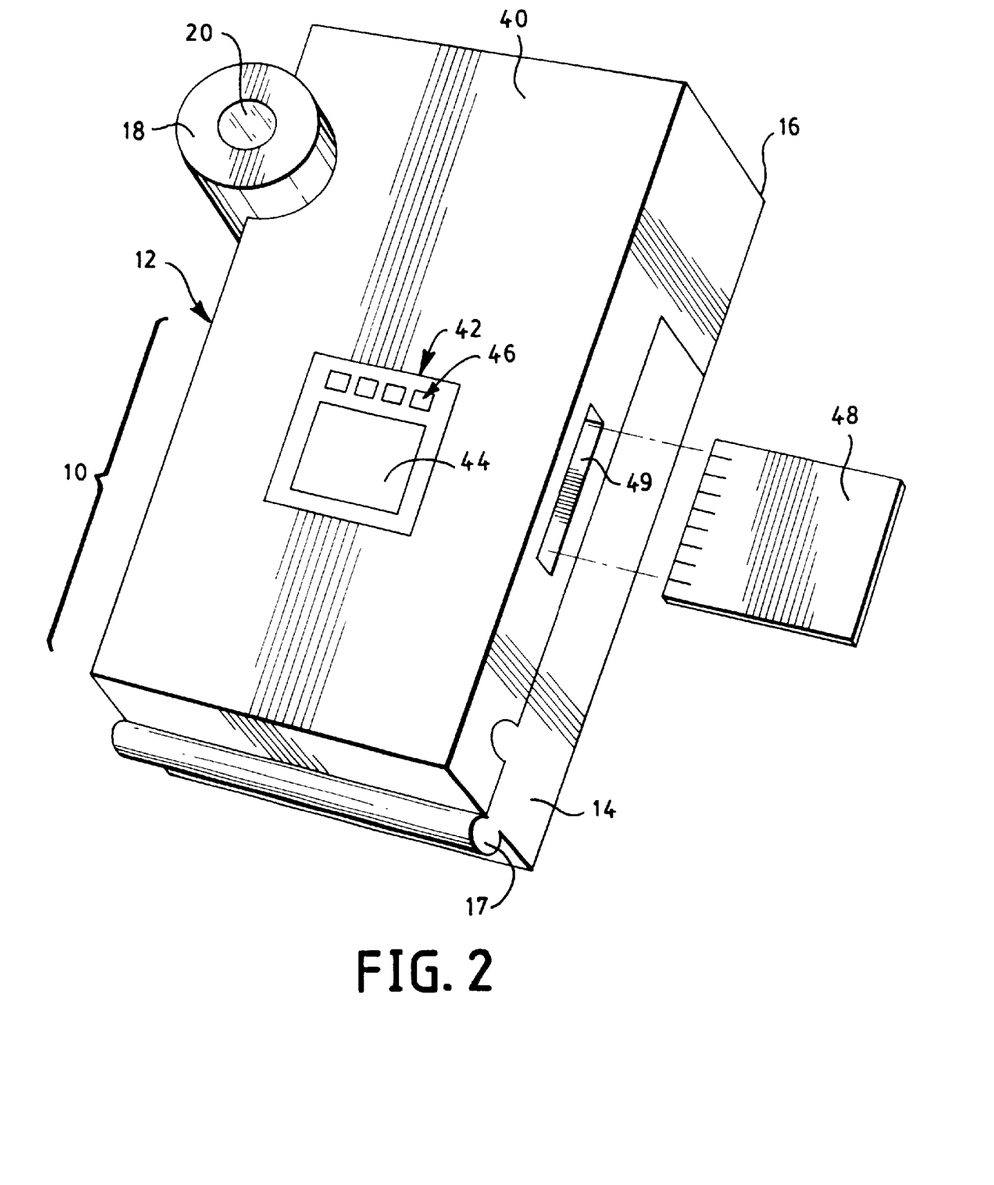
FIG. 2 is a diagrammatic isometric view of the backside of the photographic apparatus of FIG. 1.

FIG. 2 shows photographic apparatus 10 (in the closed position) as it appears to a user during operation. After the user has acquired an image, as described above, the image is stored in memory, as is well-known in the art. This memory may comprise one or more semiconductor devices on circuit board 34, or may comprise an external memory module, such as a memory board 48, which interfaces with a memory socket 49. Memory board 48 can comprise a magnetic disk drive, a flash memory, or any of various other types of memory modules known in the relevant art. In a preferred embodiment, memory board 48 conforms to the PCM/CIA standard. A commercially-available memory module conforming to this standard can thus be used as memory with photographic apparatus 10 by inserting the standardized module into memory socket 49.

After one or more images have been acquired, they may be viewed by means of a control panel 42 located on a rear surface 40 of photographic apparatus 10. Disposed within control panel 42 is a display 44 which presents a selected image to the user. In a preferred embodiment, display 44 is a color liquid-crystal display (LCD) having a resolution of approximately 400 pixels in height by 500 pixels in width. If the cost of the LCD device is not a controlling factor, a greater resolution can be specified.

Viewing and manipulation of the acquired image is preferably performed with housing 12 in the closed position and with the user either holding photographic apparatus 10 in a convenient viewing position or placing photographic apparatus 10 onto a supporting surface. Alternatively, viewing can be performed with photographic apparatus 10 in an open position. In the open viewing mode, photographic apparatus 10 may be supported with film housing 14 placed upon a suitable surface with photographic housing 16 raised at a convenient angle from the surface. In a preferred embodiment, this angle of viewing is approximately sixty degrees (60°).

Various imaging controls 46 are disposed on photographic housing 16 to provide the user with control over print characteristics such as contrast, sharpness, brightness, color and tint. These print characteristics can be modified as is well known in the art such that a corresponding processed image appears in display 44. This print characteristic modification is performed at the user's discretion prior to printing the image onto a photosensitive medium. Further, in the preferred embodiment, memory is provided on the circuit boards to store the modified image as an electronic copy of the original acquired image. Consequently, the original image need not be changed unless the user elects to save the modifications. Additionally, the user may elect to store the modified image in lieu of the original acquired image.

Alternatively, the user may view the image and select either to forego printing the image, to pass over the image for modification at a later time, or to immediately delete the image. Buttons 46 are, accordingly, provided for the deletion of an image as well as to enable the user to select and view another image. The process of reviewing and deleting an image without printing provides for a more efficient usage of the photosensitive medium. Further, when viewing images immediately after acquisition, the user can also determine, while the subject may still be available, whether a particular image should be reacquired.

Figure 3:
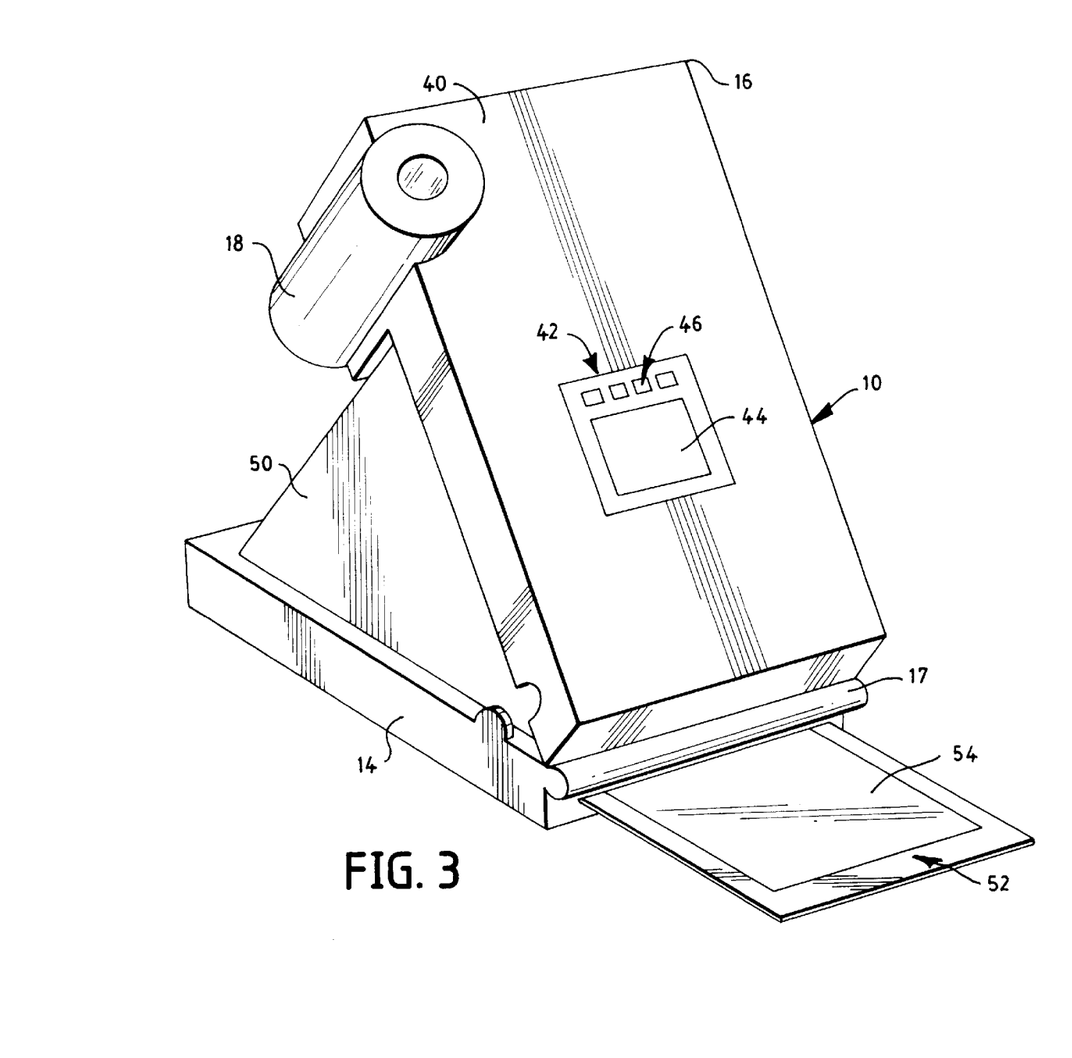
FIG. 3 is a diagrammatic isometric side view of the photographic apparatus of FIG. 1 in an open configuration as used for producing a photographic image on a light-sensitive medium.

When the user elects to print a selected image, photographic apparatus 10 opened into the position shown in FIG. 3. In this open position, photographic housing 16 has been rotated approximately sixty degrees relative to the film housing 14, and may be locked into position. A bellows 50 is deployed between photographic housing 16 and film housing 14 to form a substantially light-tight enclosure such ambient light is prevented from reaching the photosensitive medium contained within film housing 14.

To produce the desired print, the user depressed the "print" button found in imaging controls 46. A photosensitive medium 52 is then exposed to form an image area 54, and is then ejected from film housing 14. The illustrated embodiment of the invention and the discussion contained herein particularly describes using "instant film" such as that disclosed in commonly-assigned U.S. Pat. No. 4,470,448 entitled "Hybrid color films with dye developer and thiazolidine dye releaser," issued to Kliem, describing "integral-type" instant film, and U.S. Pat. No. 5,415,969 entitled "Image-receiving element for diffusion transfer photographic film products," issued to Waterman describing "peel-apart" instant film, both references incorporated herein. It will be apparent to one skilled in the art that other types of photosensitive media can be used, such as thirty-five millimeter format for example, and that in such applications, film housing 14 and imaging lens 22 are suitably modified to accommodate the alternative format.

Figure 4A:
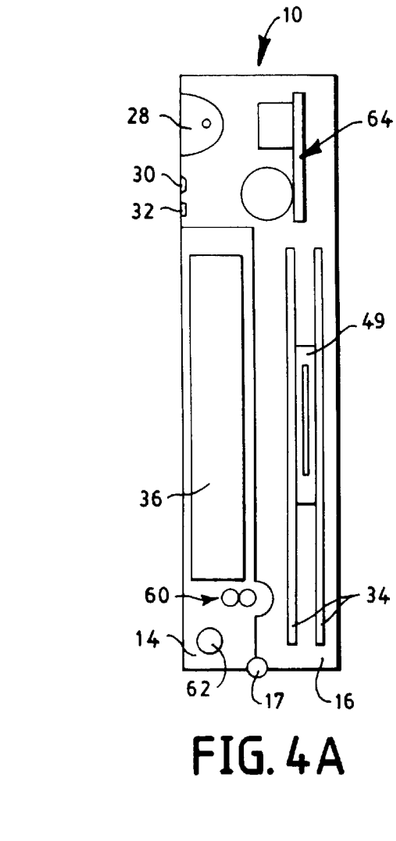
FIGS. 4A, 4B and 4C are, respectively, cross-sectional diagrammatic views of the photographic apparatus of FIG. 1 where the photographic apparatus is sectioned through the electronic flash, through the center of the apparatus, and through the imaging lens.
Figure 4B:
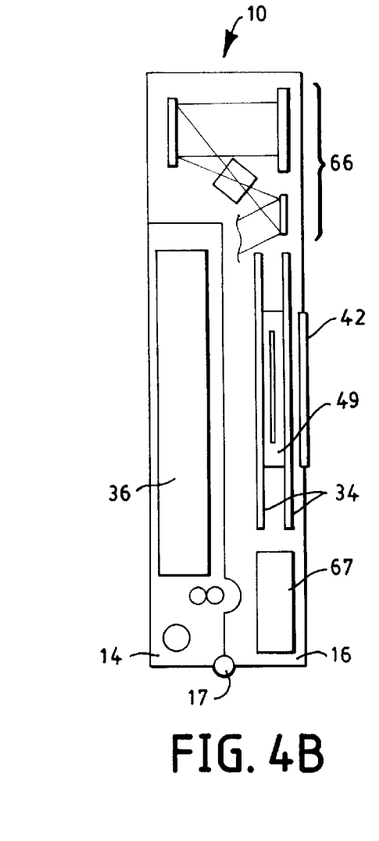
Figure 4C:
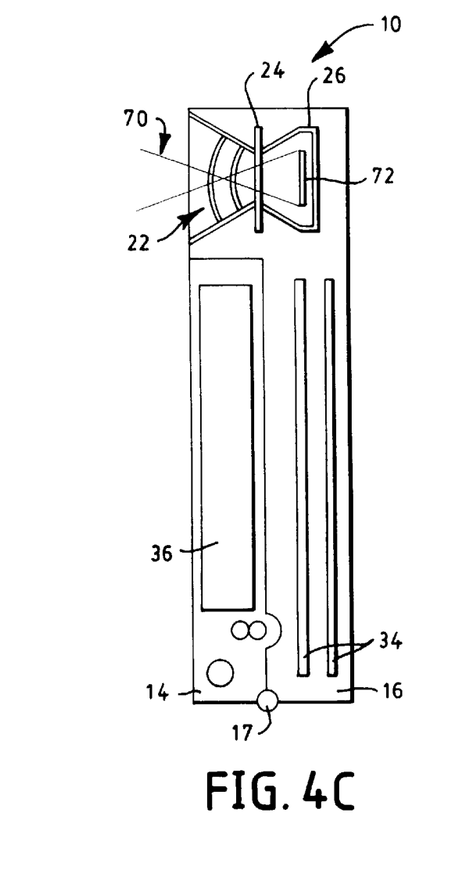

The compact arrangement of this embodiment of photographic apparatus 10 is more explicitly shown with reference to FIGS. 4A, 4B, and 4C. In FIG. 4A, photographic apparatus 10 is shown in cross-sectional view, the section taken through electronic flash 28. Electronic flash 28 is operated by means of a strobe power circuit board 64. In this example, a film pack 36 contains the photosensitive medium used in the printing operation. Following exposure, a sheet from film pack 36 is engaged by pressure means, such as a pair of processing rollers 60 powered by a processing motor 62, and ejected from photographic apparatus 10. For some types of photosensitive medium, the pressure means also serve to distribute a chemical developer over the photosensitive surface of the sheet being ejected.

The exposure of the photosensitive medium is achieved by an image printing system 66, best seen in FIG. 4B, and described in greater detail below. Near the base of photographic housing 16 is located a battery 67, used to power photographic apparatus 10. A recess (not shown) may be provided in circuit board 34 as clearance for battery 67. In the preferred embodiment, battery 67 is a rechargeable nickel-cadmium battery, but may be any conventional type of battery used in the art for similar applications.

FIG. 4C illustrates, in cross-sectional view, the image acquisition system used to transmit image-bearing light 70 through imaging lens 22 and shutter assembly 24 onto an image sensor 72. As shutter assembly 24 is opened, image-bearing light 70 passes into image sensor assembly 26 for detection by image sensor 72. Image sensor 72 converts the pattern formed by image-bearing light 70 into a sequence of electrical signals representative of the acquired image, as is well-known in the relevant art. Image sensor 72 can be any one of various semiconductor sensors designed for converting light into electrical signals such as a charge-coupled device (CCD), a charge-injection device (CID), or other such imaging device.

Figure 5:
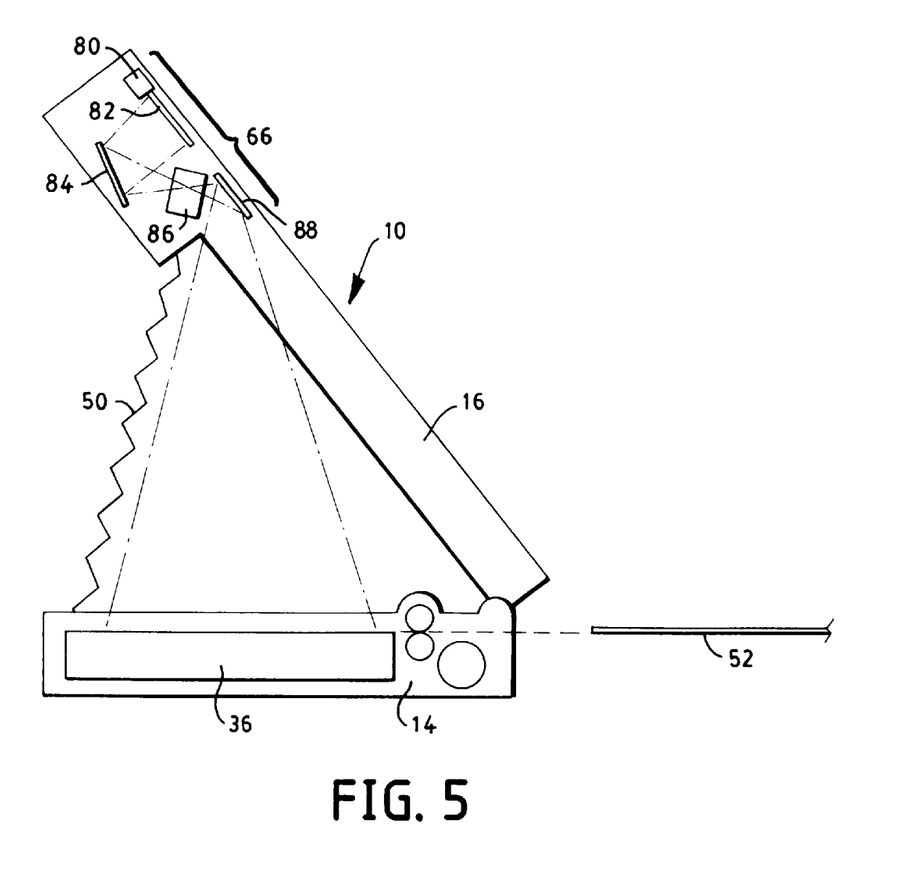
FIG. 5 is a cross-sectional diagrammatic view of the imaging optics of the photographic apparatus of FIG. 3.

FIG. 5 illustrates one embodiment of image printing system 66 comprising an LCD panel 82 and a light source 80, used to illuminate LCD panel 82 by an edge-lighting arrangement. In the preferred embodiment, LCD panel 82 is a high-resolution, monochromatic, area LCD. In a preferred embodiment, the resolution of LCD panel 82 is a minimum of 800 pixels high by 1000 pixels wide. As can be well appreciated in the relevant art, the resolution specified for LCD panel 82 should be as great as practical, while taking into consideration the cost of the LCD device, so as to fully exploit both the resolving power of photosensitive medium 52 and the quality of the optics in image printing system 66 used to project the acquired image onto photosensitive media 52. If the cost of the LCD device is not a pertinent factor in design considerations, LCD panel 82 may further comprise a color LCD device.

In the printing of an image, light provided by light source 80 passes through LCD panel 82, substantially transverse to a central axis of LCD panel 82, such that the transmitted light is incident upon a first mirror 84. The image to be printed is formed in LCD panel 82 by means of electronics within photographic housing 16. In a preferred embodiment, the image to be printed is first separated into red, green and blue (RGB) components. Each component image is successively projected onto the next available photosensitive medium in film pack 36. The light projected through LCD panel 82 is modulated according to the image component associated with one of the RGB colors. That is, the light projected is either white light modified by a suitable filter to give the color desired, or is provided by a source of colored light, such as that provided by a light-emitting diode (LED). If the LCD device used is a color LCD, only white light need be provided by light source 80, and the printing process will comprise a single exposure step.

First mirror 84 serves to reflect incident light, forming the image to be printed, to a copy lens 86 which directs the light onto a second mirror 88. Mirrors 84 and 88 serve to provide, in a compact space, the proper focal length of imaging optics 66 required by the format of the photosensitive medium used in film pack 36. As can be seen from FIG. 5, the required focal distance to photosensitive medium 52 is achieved when photographic apparatus 10 is in an open position. Therefore, when photographic apparatus 10 is in the closed position, printing is not initiated.

Figure 6A:
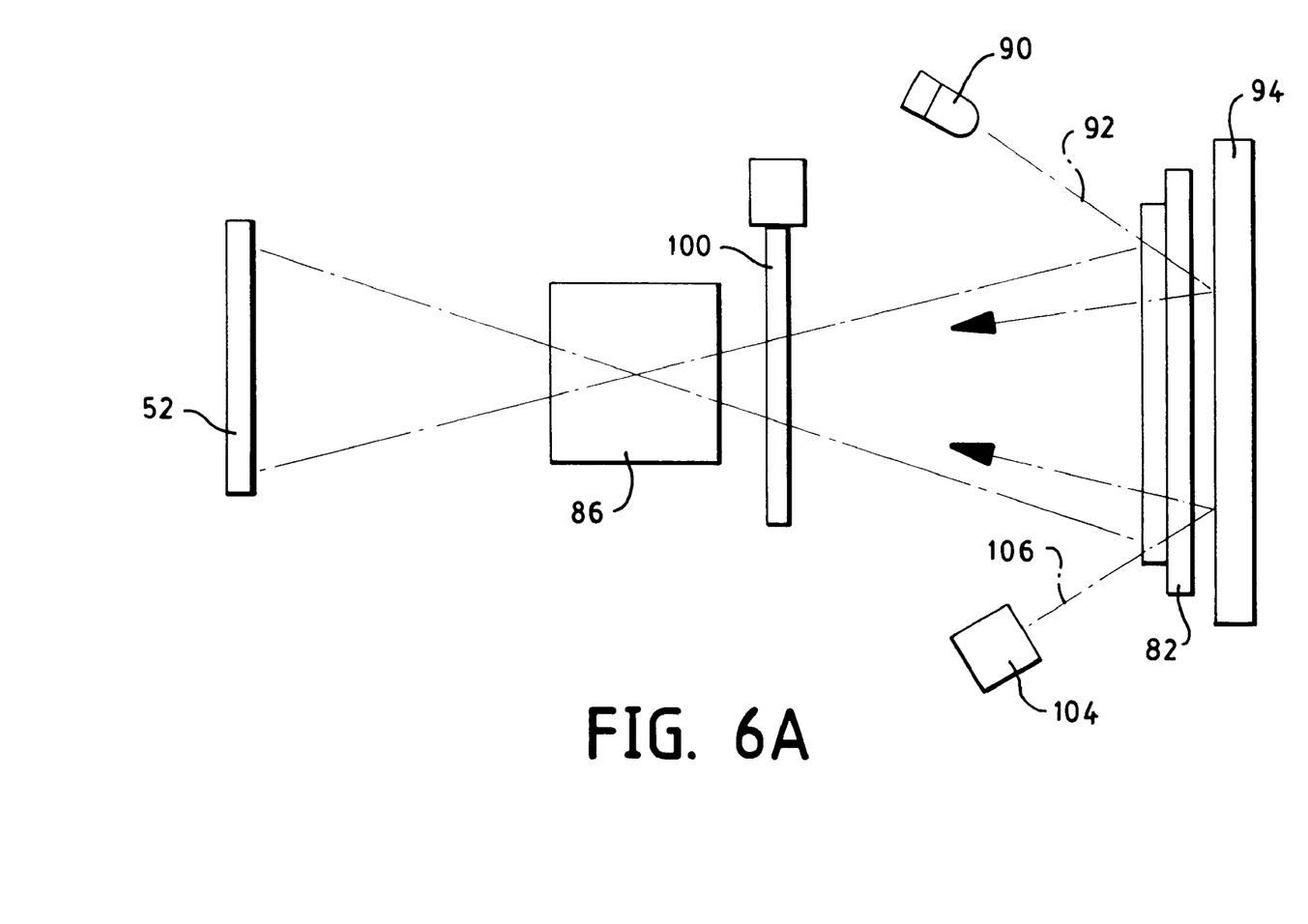
FIGS. 6A and 6B are alternative embodiments, employing illumination by means of backlighting, of the printing optics of the photographic apparatus of FIG. 5.
Figure 6B:
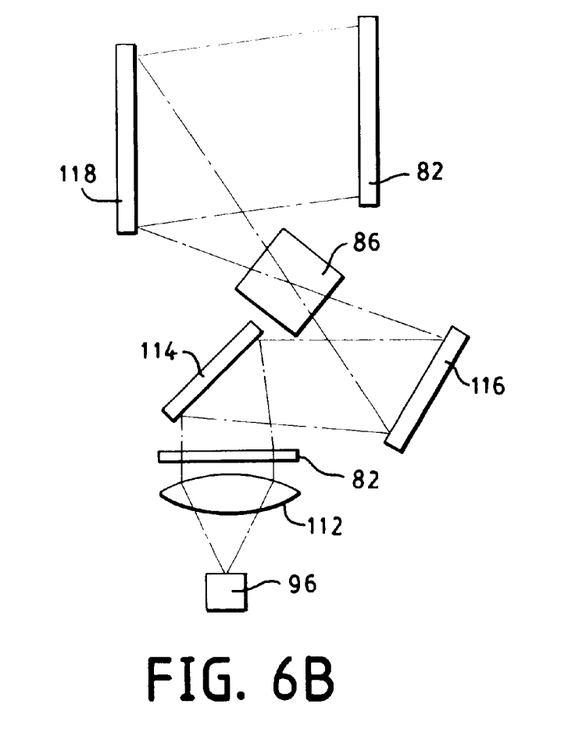

FIGS. 6A and 6B illustrate two methods of providing light to LCD panel 82 in a back-lighting arrangement. Referring to FIG. 6A, a white-light source 90 projects white light 92 onto a mirror 94. Reflected light then passes through both LCD panel 82 and a color wheel 100, comprising color filter elements. White light 92 is thus modulated by LCD panel 82, to provide an image for printing, and is filtered to provide a color component corresponding to the color filter element placed into the optical path. The modulated color component subsequently passes through copy lens 86 and is imaged onto photosensitive medium 52.

Alternatively, LED array 104 can be used to sequentially image red, green and blue light in the same manner as described above. A light 106 is emitted by LED array 104 and is incident on mirror 94. After reflection from mirror 94, the light passes through both LCD panel 82 and copy lens 86 onto photosensitive medium 52. Since the light emitted from LED array 104 is one of either red, green, or blue colors, no color wheel is required in this alternative embodiment. Preferably, the incident angle of either white-light source 90 or LED array 104, with respect to mirror 94, is specified to be such that the incident light is reflected at an angle equal to or less than optimum reflection angle for LCD panel 82, typically less than about ten degrees ($\leq 10°$).

FIG. 6B illustrates an alternative embodiment for back-lighting LCD panel 82, using a light source 96 which can be either white-light source 90, LED array 104, or other such light sources. One skilled in the art will note that a white-light source would require a color wheel, or other similar device to provide a specific color of the light, in the optical path, similar to the embodiment of FIG. 6A.

In FIG. 6B, light source 96 projects light into a collimating lens 112, which substantially collimates the light to pass through LCD panel 82. This light is incident upon a first mirror 114 and is reflected to a second mirror 116. From second mirror 116, the light is transmitted to copy lens 86, and then onto a third mirror 118. From third mirror 118, the light is projected onto photosensitive medium 52. The use of mirrors 114, 116 and 118 in this manner to produce a folded optical path allows this optical system to provide the design focal length in a compact configuration.

Figure 7:
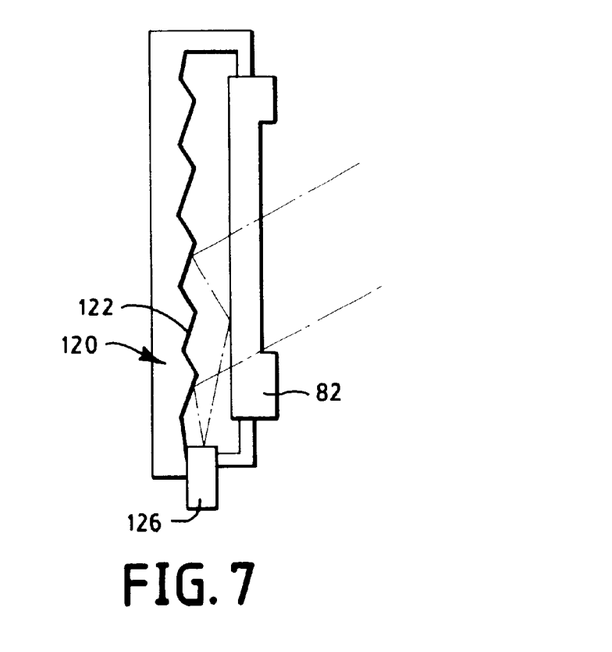
FIG. 7 is an embodiment, employing illumination by means of edge lighting, of the printing optics of the photographic apparatus of FIG. 5.

FIG. 7 illustrates one embodiment of an edge-lighted structure comprising housing 120, LCD panel 82, and a light source 126, which projects light into the chamber formed by housing 120 and LCD panel 82. Housing 120 comprises a reflective array device 122, adjacent a lateral surface of housing 120 opposite LCD panel 82. Reflective array device 122 is oriented at an angle with respect to the longitudinal axis of housing 120. Reflective array device 122 may be comprised of microprisms, multiple mirrors, or any of various other reflective devices that are capable of reflecting light from light source 126 through LCD panel 82.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A photographic apparatus for capturing an image, comprising image bearing light reflected from a subject, and subsequently projecting the image onto a photosensitive medium to produce a photographic print, said photographic apparatus comprising:

image capturing means for capturing the image bearing light and translating the image bearing light into electronic image signals representative of the image;

image rendering means in electrical communication with said image capturing means, for projecting the image onto said photosensitive medium, said image rendering means comprising
      a high-resolution liquid crystal display,
      a light source for illuminating said high-resolution liquid-crystal display, and,
      a copy lens disposed between said high-resolution liquid-crystal display and the photosensitive medium so as to project an image formed with said high-resolution liquid-crystal display onto the photosensitive medium; and selection means for selectively actuating the image rendering means to produce a photographic print corresponding to the image.

2. The photographic apparatus of claim 1 further comprising a display in electronic communication with said image capturing means, said display being adapted to display the image corresponding to said image signals.

3. The photographic apparatus of claim 2 wherein said display is a color liquid crystal display.

4. The photographic apparatus of claim 2 wherein said display is a low-resolution liquid-crystal display.

5. The photographic apparatus of claim 1 wherein said photographic apparatus further comprises image control means for modifying print characteristics prior to printing the image via said image rendering means.

6. The photographic apparatus of claim 1 further comprising a socket adapted to receive external memory means.

7. The photographic apparatus of claim 6 wherein said external memory means comprises an electronic data storage device.

8. The photographic apparatus of claim 1 wherein said image-rendering means further comprises:

a housing having a proximal edge and a lateral surface integral with said edge, said lateral surface disposed substantially transverse to said edge, said high-resolution liquid-crystal display being disposed in said lateral surface and said light source being disposed in said edge; and a plurality of light-reflective devices disposed within said housing, said light-reflective devices opposed to said high-resolution liquid crystal display such that said light is redirected through said high-resolution liquid crystal display.

9. The photographic apparatus of claim 1 wherein said light source emits white light and said image rendering means further comprises a color filter wheel rotatably disposed to selectively modulate a color of said light projected onto said photosensitive medium.

10. The photographic apparatus of claim 1 wherein said light source comprises a plurality of light emitting diodes which selectively project a single color of light onto said photosensitive medium.

11. The photographic apparatus of claim 1 wherein said photographic apparatus comprises a portable, hand-held device.

12. The photographic apparatus of claim 1 further comprises a housing having a viewing projection extending laterally therefrom within which a viewfinder is disposed, said viewing projection extending outward said housing such that the nose of a user is positioned adjacent said housing when the user views the subject through said viewfinder.

13. A camera-printer combination comprising an electronic camera adapted to record as electronic signals image bearing light representative of an image; and a film recorder in electronic communication with said electronic camera, said film recorder being selectively actuatable to record the image on photosensitive media, said camera-printer combination exhibiting an imaging mode and a printing mode, said imaging mode enabling recording of the image by said electronic camera while disabling printing by said film recorder, and said printing mode disabling recording of the image by said electronic camera while enabling printing by said film recorder.

14. The camera-printer combination of claim 13 further comprising a display in electronic communication with said electronic camera, said display adapted to project the image recorded by said electronic camera.

15. The camera-printer combination of claim 14 further comprising control means for selectively altering properties of the image in said display such that the image in said display is modified according to changes made in the image properties.

16. The camera-printer combination of claim 13 further comprising selection means for selectively actuating said film recorder for printing the image represented by said electronic signals.

17. The camera-printer combination of claim 14 further comprising a housing selectively movable between a closed position and an open position, said closed position enabling said electronic camera to record the image, and said open position enabling printing of the image by said film recorder.

18. The camera-printer combination of claim 17 further comprising a display for viewing the image wherein said open position is angularly adjustably to accommodate viewing said display.

19. A method of recording an image of a subject on photosensitive media within a photographic apparatus, said method comprising the steps of: capturing at least one image electronically within said photographic apparatus; viewing said image on a display disposed upon said photographic apparatus; selecting said image for printing;

forming said image in a high-resolution liquid crystal display;

illuminating said high-resolution liquid-crystal display to project an image-bearing illumination through a copy lens; and projecting said image-bearing illumination from said copy lens onto a photosensitive medium within said photographic apparatus such that said image is printed onto said photosensitive medium.

20. The method of claim 19 further comprising the step of adjusting properties of said image on said display prior to printing.

* * * * *